Figure 1:
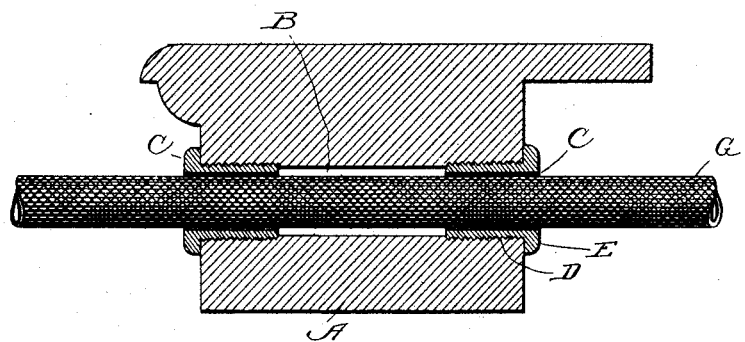
Figure 2:
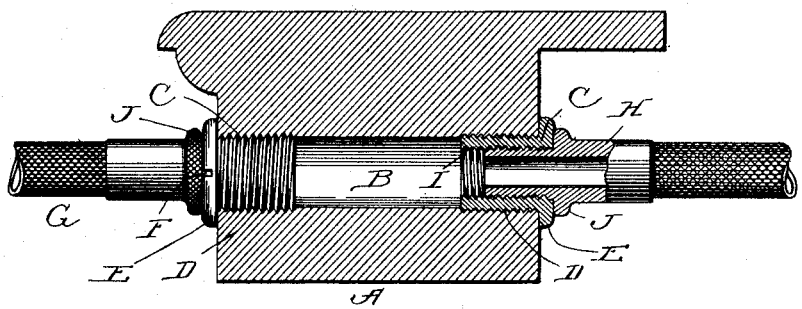

No. 631,124. Patented Aug. 15, 1899.
W. PERPENTE.
SPEAKING TUBE FOR VEHICLES.
(Application filed Oct. 27, 1898.)

(No Model.)

Witnesses
Harry S. Rohrer
A. M. Spofford.

Inventor
William Perpente
by Frank L. Dyer
Attorney

United States Patent Office.

WILLIAM PERPENTE, OF NEW HAVEN, CONNECTICUT.

SPEAKING-TUBE FOR VEHICLES.

SPECIFICATION forming part of Letters Patent No. 631,124, dated August 15, 1899.

Application filed October 27, 1898. Serial No. 694,736. (No model.)

*To all whom it may concern:*

Be it known that I, WILLIAM PERPENTE, a citizen of the United States, residing at New Haven, in the county of New Haven and State of Connecticut, have invented certain new and useful Improvements in Speaking-Tubes for Vehicles; and I do hereby declare the following to be a full, clear, and exact description of the invention, which will enable others skilled in the art to which it appertains to make and use the same.

My invention relates to improvements in movable speaking-tubes or whistles or combinations of speaking-tubes and whistles adapted to be attached to vehicles to allow communication being had between the driver and the occupant thereof. Heretofore such tubes have sometimes consisted of a flexible pipe formed of a fabric-covered rubber tube surrounding a coiled-wire spring. This tube is usually provided with mouthpieces at its extremities, while in addition thereto a whistle is combined at either or both ends. The tube usually passes through an opening in the top front panel of the vehicle. The hole made in the panel is finished by means of two metal panel-washers, one on the inside and the other on the outside of the carriage. The objections to this means of attachment of speaking-tubes are considerable. First, it is impossible to make a tight enough joint between the speaking-tube and the panel-washers to keep out rain or water when the carriage is being washed. Second, the tube not fitting tight within the washers soon moves back and forth and is twisted to some extent, which soon causes it to wear out and leak air, so that the whistle will not operate. Third, no means is provided for readily removing the tube from the vehicle, the usual way consisting in removing one of the end attachments, which is usually secured with glue and by the means of a wrapping of fringe, &c., and then pulling the tube through the washers.

Broadly considered, my invention consists in dividing the tube into two parts and in providing a threaded connection to each part of the tube which can be engaged with corresponding threads in the washers. This will make a water-tight and air-tight joint at the outside and inside of the vehicle and yet will permit either part of the tube being removed at will.

In order to properly understand my invention, attention is called to the accompanying drawings, in which—

Figure I represents a section of the front panel of a vehicle fitted with a tube in the old way. Fig. II is a similar view of my improvement.

In both of the views like parts are indicated by the same letters of reference.

A is the front panel of the vehicle, with a round hole B through the same.

C C are washers provided with screw-threads D D thereon, having engagement with the wood of the panel.

E E are flanges or shoulders formed upon the outside of the washers. The latter are provided with suitable means for applying it and tightening it within the opening B. A preferable means is shown in the drawings, consisting of the notches F F for the application of a screw-driver.

The flexible tubes G G are each provided upon one of their extremities with the screw-threaded plug or coupling H H. The threads of the latter engage with corresponding threads I I on the inside of the panel-washers. A flange J J on each of the plugs or couplings is provided for greater security. For greater facility in adjusting the plug or coupling the flange is milled, as shown. Instead of threaded connections taper plugs may be substituted without departing from the spirit of my invention.

The operation of my device is as follows: The two sections of the tube are screwed into the washers, allowing one section to drop in the interior of the vehicle, while the extremity of the other section is within convenient reach of the driver. The manner of use is obvious. In case any repairs have to be made one section or both of them may be easily removed by unscrewing the coupling. The joining on the outside of the vehicle is sufficiently tight to prevent water entering, or should it become loose the washer may be made tight by applying a screw-driver or similar instrument to the notches formed within the flange thereof, the section of tube, with its corresponding coupling, being removed for that purpose.

Having now described my invention, what I claim as new, and desire to secure by Letters Patent, is as follows:

1. In a speaking-tube for vehicles, the combination with the front panel having a hole B through the same, the two independent flexible tubes, and screw-threaded couplings secured to the extremities of said tubes, the said couplings being adapted to engage with the panel adjacent to the hole B, substantially as described.

2. In a removable speaking-tube for vehicles, the combination with the front panel having a hole B through the same, the washers C attached to said panel adjacent to the ends of the hole B, the flexible tubes G, and the plugs H secured to the extremities of said tubes, the said plugs being adapted to be inserted within the washers C, substantially as described.

3. A speaking-tube for vehicles with a section of tube having a screw connection upon one extremity thereof in combination with a washer having internal screw-threads and external threads adapted to engage with a portion of the vehicle, substantially as described.

4. In a speaking-tube for vehicles, a washer therefor having a flange E, a notch F therein, and the depending stem with external screw-threads D, D, thereon, and internal threads I, I, therein, substantially as described.

This specification signed and witnessed this 17th day of October, 1898.

WILLIAM PERPENTE.

Witnesses:
SIEGWART SPIER,
TIMOTHY J. FOX.